Feb. 14, 1961  J. E. SMART, JR  2,971,313
GRASS CATCHING BASKET FOR USE ON ROTARY LAWN MOWER
Filed March 31, 1958
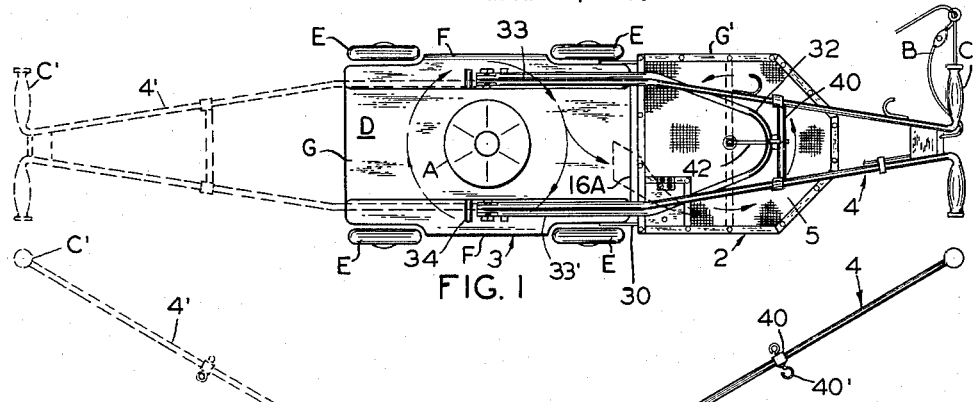
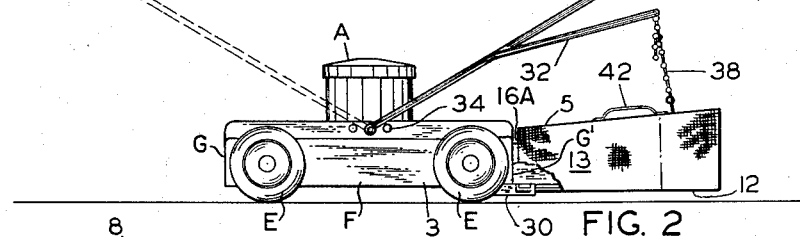
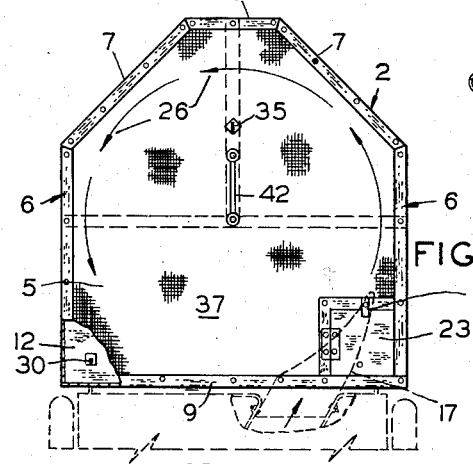
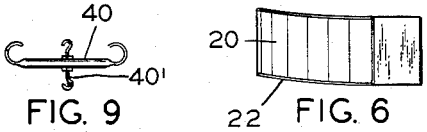
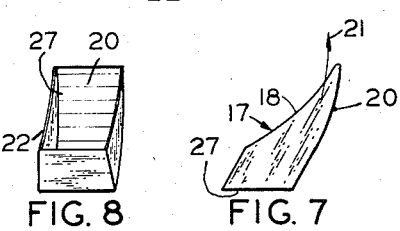
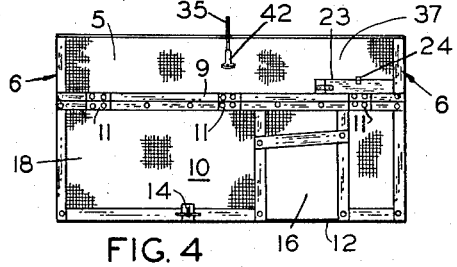
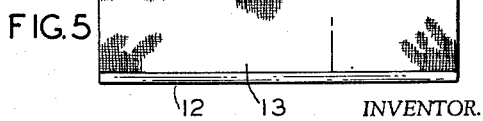
INVENTOR.
James E. Smart, Jr,
BY Scott L. Norvell

United States Patent Office 2,971,313
Patented Feb. 14, 1961

2,971,313

GRASS CATCHING BASKET FOR USE ON ROTARY LAWN MOWER

James E. Smart, Jr., 2202 N. 28th St., Phoenix, Ariz.

Filed Mar. 31, 1958, Ser. No. 725,377

1 Claim. (Cl. 56—25.4)

This invention concerns a basket for use on rotary lawn mowers.

These mowers are of a type wherein there is a steel case supporting a motor which drives a blade or blades in a horizontal rotary path.

The whole assembly is moved over the lawn to be cut and as a rule the cut grass is forced out of an opening or several openings on the peripheral rim of the case. Heretofore, for the most part, the grass, after being cut, was carried around within the case several times until it was cut up into fine particles and this mass, known as mulch, was forced out from the case and intended to fall onto the lawn and become part of the compost around the roots of the grass.

In certain areas the volume of grass is such that there is too much compost formed and the lawn becomes built up too thick. In other areas the extent of the cut grass and compost is such that it chokes new growth of the grass.

In order to remove the greater part of the compost, and otherwise maintain the lawn in clean condition, I have provided the grass catcher for rotary lawn mowers described below.

One of the objects of the invention is to provide a simple and cheaply made basket, covered chiefly with wire mesh, together with means for efficiently attaching it to the mower frame and of supporting it either on the mower handle or by a separate support;

Another object is to provide a grass catcher for rotary lawn mowers which will receive the cut grass thrown out of the case by the cutter blades and dispose of this grass so that it will not choke or constrict the passageways leading from the mower case to the basket;

Still another object is to provide a mower basket for rotary lawn mowers which may be readily attached to and detached from the mower case and which will take advantage of the motion of the grass as it leaves the cutter and deposit this grass within the catcher in a manner so that the grass first caught and received will not interfere with the grass later supplied;

Still another object is to provide a basket for receiving grass from rotary lawn mowers having a frame to support the basket on the mower body and a directive curved vent which will fit into the mower body and conduct the grass in a curved semi-circular path within the screen walls of the basket so that its velocity is maintained until it completes the circuitous path and is stopped by the screened front end of the basket.

Other objects include the provision of an access door to the interior of the basket so that the user can easily have access to grass or other objects caught in its interior in order to move grass and objects picked up to a position where they will not interfere with the flow of grass into the basket;

The objects also include a hinged door mechanism for opening the basket to disclose all of its contents.

Other objects will appear hereinafter.

I attain the foregoing objects by means of the devices, parts and combinations of parts shown in the accompanying drawings in which—

Figure 1 is a plan view of my improved rotary lawn mower basket together with one type of rotary lawn mower and a handle for operating same;

Figure 2 is a side elevational view of the device as shown in Figure 1;

Figure 3 is a plan view of the basket without the mower attached, drawn on an enlarged scale;

Figure 4 is a front elevational view of the basket shown in Figure 3;

Figure 5 is a side elevational view of the basket shown in Figure 3;

Figure 6 is a side view of the chute connecting the basket with the rotary motor frame;

Figure 7 is a plan view of said chute;

Figure 8 is an end view of said chute; and

Figure 9 is a front elevational view of a bracket used optionally to support the rear portion of the basket.

Similar numerals refer to similar parts in the several views.

In general the basket is indicated by numeral 2, the mower frame by numeral 3 and the mower frame handle by numeral 4.

The basket 2 is composed of a top 5 which includes frame members 6 which extend along both sides and are joined at the rear by two angularly extending frame pieces 7 and an end piece 8, forming a half hexagonal contour. At the top and front of the basket there is a straight frame member 9. Extending downward from the frame member 9 there is a hinged door 10 supported by hinges 11 which extend between the top of the door and the frame member 9. This is held shut by a hasp and pin 14 at the bottom. On the right hand side of the door 10, as shown in Figure 4, there is an opening 16 through which the chute 17 enters. The rear end of this chute has a curved edge 18 adjacent its rear opening and a curved plate 20 which closes its outer part and directs the cut grass in a curved path in the direction of arrow 21. The bottom 22 of the chute is curved upwards somewhat to give the grass entering the basket through the chute a slightly upward direction to thereby keep it from falling to the floor of the basket at once. The front end of chute 17 is fitted into a hole 16A in the rear of mower frame 3.

The bottom of the basket is closed by an imperforate plate 12, the edges of which follow the half hexagonal rear contour of the top 5 as defined by frame pieces 6, 7, 8 and 9. The sides and back of the basket are closed by fabric 13, such as canvas which also follows the contour of the top and bottom. The top 5 is closed and covered with screen 37, as is the front door 18.

Observing Figure 3, it will be noted that the plan view of the basket shows the access door 23 hinged on the left side to members of the top frame and closed by a hasp 24. The outline of the basket, as shown in this view, indicates that the grass may enter through the chute 17 and then take a substantially semi circular path around the inner face of the sides and back of the basket, as indicated by arrows 26. The grass, after entering through the chute 17 which is on the right side of front door 10, as above mentioned, continues in the semi-circular path indicated until it impinges on the left side of the basket and the left portion of closure door 10. It is known that when grass is cut by the rotary lawn mower it is thrown outward in a circular path with considerable centrifugal force. The chute 17 directs this force to keep the grass moving around the inner face of the side walls of the basket until it is stopped by the front door 10. At this point the grass starts to accumulate and as the grass builds up against the door wall 10 until it fills up the entire height of the front end of the basket on the left side as viewed in Figure 4, which is the side opposite to the side of entry through opening 16. The grass continues to build up rearwardly from door 10 and thence around the back to the right and finally fills the area adjacent to the inlet opening 27 of the chute 17.

The front end of the basket is supported on each side by the hooks 30 which extend rearward from the rear portion of the mower frame 3. The weight of the rear portion of the basket, as shown in Figure 2, is supported by the crane 32 which has side bars 33 and 33' attached to the center of the top of the mower frame 3 on each side. The stops 34, on each side of the mower frame, support both the crane 32 and the tubular parts of the handle 4. An eye bolt 35 is affixed to the top 5 of the basket body and is connected by a chain 38 to the outer end of the crane 32 and/or to an eye bolt on the bracket 40 when used. The eyes to which the chain is attached are opened so that the chain may be easily removed.

In the form of mower shown in Figures 1 and 2, the cutter is driven by an electric motor A. This receives power through the electrical conduit cable B which is secured to the right side of handle C.

The mower frame 3 has a rectangular top D with wheels E which are on the sides F and permit cuts in the direction of either end, G or G'. Cutting toward end G may be considered the "forward" cut and toward end G' the "rearward" cut. Cut grass is ejected through discharge opening 16A in the rear end G' of frame 3.

When using this type of mower it is necessary to reverse the handle to the position shown in dotted outline C' on the frame 3; to keep from entangling the cable with the mower. The basket is then pushed ahead of the mower frame 3, during the second or reverse cut. Mowing progresses back and forth in a zig zag fashion without turning. The crane 32 supports the outer part of the body of the basket at all times.

Where a gasoline motor is used instead of electric motor A no cable is needed. The mower may be turned or pivoted at the end of each pass. Thus, no crane is needed. To support the outer portion of the basket a cross bar 40 is attached to the handle 4, and is provided with a hook 40' which will engage chain 38 and support the basket's outer end.

Dumping the basket is as follows: After removing chain 38, the front end of the basket is easily unhooked from the laterally positioned hooks 30 and then the entire basket may be lifted by handle 42. After moving the filled basket to a larger receptacle it is emptied by unfastening hasp 14 and letting the front door 10 hinge outward. In doing this the opening 16 in the door 10 merely slides off of the chute 17 which remains fixed in the cut grass ejection opening 16A of the mower frame 3.

I claim:

For use in combination with a rotary blade mower having a housing including a grass discharge opening through which grass clippings are centrifugally discharged, a grass catching basket including attaching means thereon removably securing it to said housing in projecting relation from the grass discharge opening, said grass catching basket including a perforated end piece having an opening therethrough aligned with the grass discharge opening of said housing, said opening in the basket being disposed adjacent one side thereof, a cut-grass conveying chute mounted in said grass discharge opening and terminating within said basket adjacent said one side, said chute having a curved side wall projecting into said basket for receiving centrifugally discharged grass clippings and directing them in a curved path within said basket, said chute having an upwardly curved bottom wall for elevating said grass clippings to aid it in its circular path of movement, said basket including a closed bottom, a perforated top and closed side walls connected to a closed rear end wall having a frame comprising angularly extending pieces and an end piece forming a guide portion from the curved wall of said chute which is substantially semi-circular, the grass clippings being directed from said mower housing into said basket through said perforated end piece and around a substantially circular path terminating at said perforated end piece.

References Cited in the file of this patent

UNITED STATES PATENTS

| | | |
|---|---|---|
| 666,780 | Trigalet | Jan. 29, 1901 |
| 1,336,257 | Muzzy | Apr. 6, 1920 |
| 2,494,062 | Sherrow | Jan. 10, 1950 |
| 2,633,688 | Yeck et al. | Apr. 7, 1953 |
| 2,641,100 | Sylvester | June 9, 1953 |
| 2,675,661 | Titzer | Apr. 20, 1954 |
| 2,747,356 | Peterson | May 29, 1956 |
| 2,783,604 | Cahill | Mar. 5, 1957 |
| 2,851,844 | Bailey | Sept. 16, 1958 |
| 2,855,744 | Phelps | Oct. 14, 1958 |